United States Patent

Rumez et al.

[11] Patent Number: 5,836,050
[45] Date of Patent: Nov. 17, 1998

[54] APPARATUS FOR CONTROLLING THE OPENING MOVEMENT OF A VEHICLE DOOR

[76] Inventors: Werner Rumez, Geisbergweg 9, D-75417 Muehlacker; Siegfried Sumser, Im unteren Kienle 9, D-70184 Stuttgart, both of Germany

[21] Appl. No.: 619,664
[22] PCT Filed: Nov. 30, 1995
[86] PCT No.: PCT/DE95/01689
  § 371 Date: Aug. 25, 1996
  § 102(e) Date: Aug. 25, 1996
[87] PCT Pub. No.: WO96/17182
  PCT Pub. Date: Jun. 6, 1996

[30] Foreign Application Priority Data

Nov. 30, 1994 [DE] Germany .......................... 44 42 547.3

[51] Int. Cl.⁶ .................................................. E05F 3/00
[52] U.S. Cl. ................................. 16/84; 16/82; 292/338
[58] Field of Search .................................. 16/84, 82, 66, 16/71, 49, 51, DIG. 17; 49/386, 387, 384, 394; 292/338, 265, DIG. 17, DIG. 19

[56] References Cited

U.S. PATENT DOCUMENTS

| 3,711,892 | 1/1973 | Tabor | 292/338 |
|---|---|---|---|
| 4,078,779 | 3/1978 | Molders | 292/338 |
| 4,339,843 | 7/1982 | Burnett, Jr. | 16/66 |
| 4,564,973 | 1/1986 | Kordes | 16/71 |
| 4,596,383 | 6/1986 | Howard | 16/84 |
| 4,807,855 | 2/1989 | Schuitema | 292/338 |
| 4,925,230 | 5/1990 | Shelton | 292/338 |
| 5,507,070 | 4/1996 | Spyche et al. | 16/49 |
| 5,592,780 | 1/1997 | Checkovich | 49/386 |

FOREIGN PATENT DOCUMENTS

| 0568006 | 11/1993 | European Pat. Off. | F16F 09/02 |
|---|---|---|---|
| 0602917 | 6/1994 | European Pat. Off. | F16F 9/02 |
| 2335136 | 7/1977 | France | F16F 9/44 |
| 9308253 U | 8/1993 | Germany | F16F 9/02 |
| 6147247 | 5/1994 | Japan | F16F 9/08 |
| 4811 | of 1882 | United Kingdom | 16/66 |

*Primary Examiner*—Chuck Mah
*Attorney, Agent, or Firm*—Karl Hormann

[57] ABSTRACT

An upwardly pivotable vehicle lid is provided with a pneumatic pressure strut intermediate body and lid, as an opening drive for the pivot movement into a terminal position having a maximum pivot angle, with the extending movement of a piston rod out of the pneumatic strut cylinder defining the pivot angle being limitable in a plurality of positions ahead of the maximally possible pivot angle by an arresting device mounted outside of the cylinder. The arresting device includes an arresting member positioned on the cylinder of the pneumatic pressure strut and movable into frictional engagement with a complementary member movable by the piston rod of the pneumatic strut.

17 Claims, 2 Drawing Sheets ated with $25$

APPARATUS FOR CONTROLLING THE OPENING MOVEMENT OF A VEHICLE DOOR

CROSS-REFERENCE TO RELATED APPLICATIONS

This is an application pursuant to 35 U.S.C. 371 of International Application PCT/DE95/01689 filed 30 Nov. 1995 published as WO96/17182 Jun. 6, 1996.

BACKGROUND OF THE INVENTION

Field of the Invention

The invention, in general, relates to an arresting device for a pivotable lid of a vehicle and more particularly, to a device selectively limiting the extent to which a vehicular door may be opened.

It is commonly known to accomplish the opening movement of a vehicle lid, such as the lid of a trunk (boot) or hood (bonnet) by means of a pneumatic pressure strut. A soon as the lid is unlatched it is pushed upwardly by the force of the pneumatic strut, until it has reached its maximum open terminal position.

A pneumatic pressure strut having a lever associated with it which is arrestable at various lengths at an arresting device is known from German patent DE 43 02 502 C.. (as well as German laid-open patent specification DE 43 06 882 A1). In the arrangements disclosed therein the piston rod of the pneumatic strut is concurrently maintained at the corresponding extended positions. The lever extends in parallel to the pneumatic strut across the entire surface of the rear hatch and is latched by a complex centrifugal element when the hatch is manually stopped during its upward pivoting movement. If it is not stopped in this manner, the hatch will pivot upwardly to the full extensible length of the pneumatic strut.

In German utility model DE 89 15 891 U, there is described a pneumatic pressure strut having a sleeve pushed over its cylinder which sleeve may releasably be arrested on the cylinder in two positions. This does not affect the length to which the piston rod may be extended.

The extension lever at one end of a pneumatic pressure strut described in German laid-open patent specification DE 40 00 862 Al allows for but one additional open pivotal position of a rear hatch.

Changing in the length of a fully extended pneumatic pressure strut is also known from German utility model DE 78 33 766 U and laid-open patent specification DE 41 07 382 A1, in which the end of a piston rod is slidable in a connecting threaded sleeve with either the piston rod or the threaded sleeve having to be rotated, and following adjustment, further rotation has to be prevented. This does not provide for a simple way of arresting in different positions.

From German patent DE 25 55 062 C3 an arresting device for the rear hatch of a vehicle is known which includes a pneumatic pressure strut, the piston of which may be arrested at different extended positions relative to the length of a cylinder, thus maintaining the rear hatch in different open positions. For this purpose, the usual piston of a common pneumatic strut has been altered in a complex manner by the addition to the piston, within the cylinder, of a force-actuated latching member, for controlling the latching. For this type of application, the use of commercially available pneumatic pressure struts at vehicle rear hatches is then no longer possible.

Changing the angular disposition of a hatch moved by a pneumatic strut by means of a telescoping tube extendible from a cylinder is known from German laid-open specification 32 25 974 A1.

OBJECT OF THE INVENTION

It is an object of the invention to make an arresting device in which a piston rod may be arrested at the cylinder by simple means and whereby an unintentional excessive pivotal opening movement of the rear hatch may be prevented.

The arresting device in accordance with the invention makes possible movement of different lengths of the piston rod of a pneumatic pressure strut for stopping a vehicle hatch, when necessary, before it has reached its maximum open angular disposition. For this purpose, a commercially available and, therefore, inexpensive pneumatic strut may be utilized. The frictional connection of an arresting member arranged on the cylinder to a complementary member movable with the piston rod leads to a simple and, therefore, economic structure which because of its small size does not interfere with the vehicle hatch. In the manually actuable version, the vehicle hatch is stopped before reaching its maximum opening angle and may be moved into its maximum opening position in a controlled manner by a person deliberately applying a greater force. In a sensor controlled version, the lid is stopped at a reduced angular disposition when a wall or other object comes too close to the edge of the pivoting vehicle hatch, thus preventing it from being damaged. In such an arrangement, a person not wanting the largest opening, because he would have difficulties moving the hatch down again, for instance, could prevent the maximum pivotal opening by affecting the sensor.

The arresting member and the complementary member required for the frictional connection may be arranged for sliding movement at different positions of the strut cylinder and the piston rod, respectively, so that the maximum values of the arresting positions may be adjustable along the axis of the strut cylinder and accomodate the structure of the vehicle. The frictional connection of arresting member and complementary member is simplified by affixing the complementary member opposite the arresting member on a tube which embraces the strut cylinder at a predetermined spacing therefrom. In fact, the frictional connection may be established by the interior surface of the tube acting as the complementary member.

A frictional connection between the arresting and complementary member may be provided by two corrugated tubes which move into engagement with each other at different positions of the piston rod and initially stop the movement of the piston rod. Thereafter, extending the piston rod further, up to its maximum, becomes possible only with greater force and by the resilient yielding of at least one of the corrugated tubes. The increasing overlap of the corrugated tubes or the increasing number of ratcheting interlocks, as the case may be, leads to a noticeable increase of the force necessary for movement into the terminal position. The increase in actuation force signals to a user that the greatest pivot angle of the vehicle lid is approaching.

The frictional engagement between the arresting member and the complementary member may also be established by sliding one of the members in the direction of the other. In such an arrangement a positive abutment or a frictional abutment may be provided. This movement of the members toward each other may be accomplished by simple components, such as a spring or a magnet, or by a valve-controlled filling of an inflatable body. A sensor may be positioned at the hatch of the vehicle which, as an edge of the hatch approaches a stationary obstacle, for instance, initiates this movement to bring about timely stopping of the vehicle hatch. Also, a switch may be provided at the handle of a vehicle hatch for arresting or releasing movement of the hatch. Such a switch may for instance also be, actuated by the sensor as a hand of a user approaches the handle.

Further advantages and embodiments are set forth in the subclaims and in the description.

DESCRIPTION OF THE DRAWINGS

The invention will be described with reference to a drawing, in which.

DETAILED DESCRIPTION OF THE PREFERRED EMBODIMENTS

Figure 1:
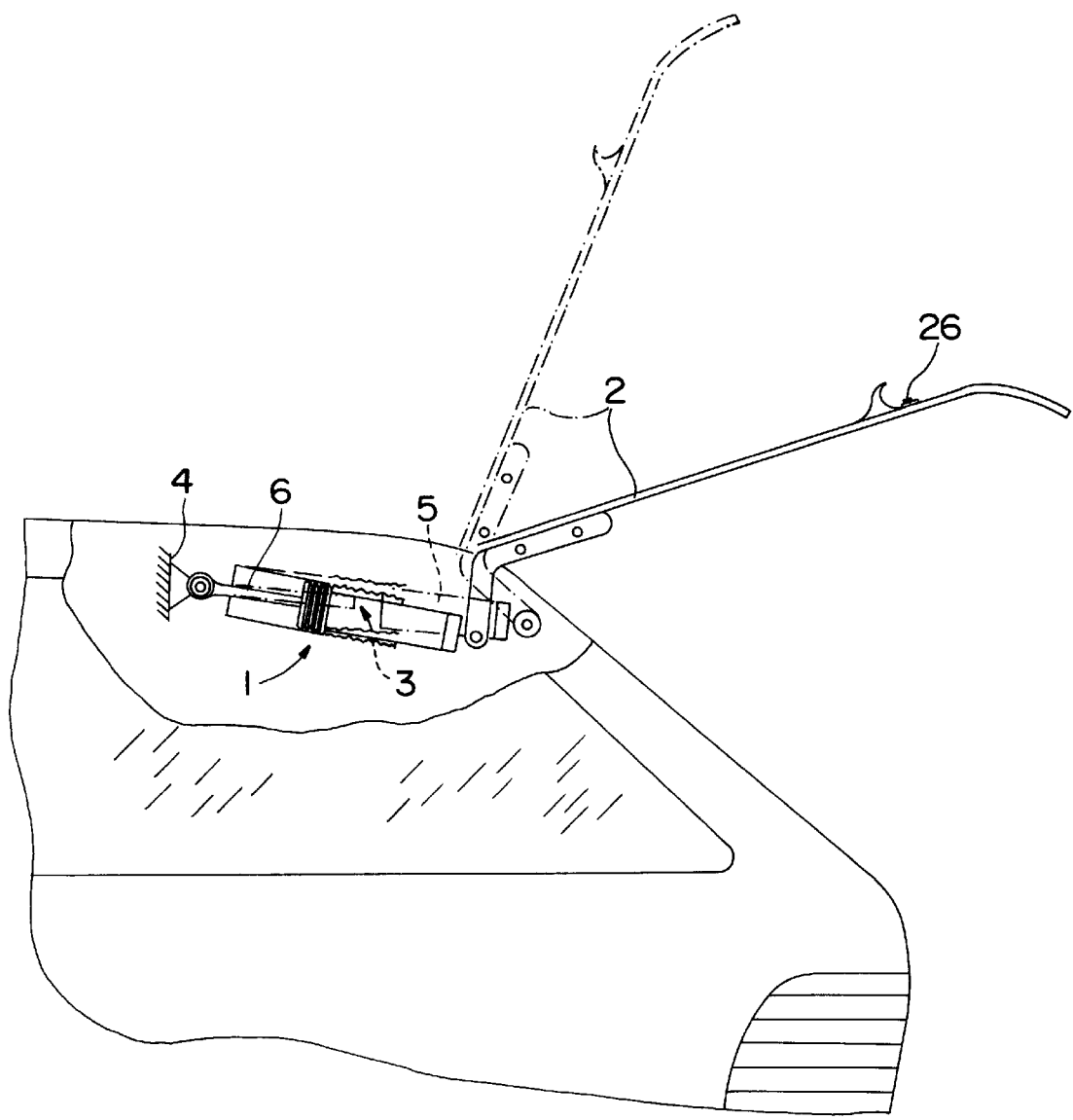
FIG. 1 depicts the rear of a vehicle with a rear hatch pivoted and arrested by a pneumatic pressure strut, in two different positions.

FIG. 1 shows an arresting device 1 for a pivotable vehicle lid 2, shown as a rear hatch. The arresting device 1 is provided with a pneumatic pressure strut 3 extending between a body 4 of a vehicle shown only partially and the rear hatch 2 thereof, and providing a drive motor for the opening pivotal movement of the hatch 2 up to a terminal position at a maximum pivot angle shown in dashed lines. As usual, the pneumatic strut 3 is provided with a cylinder 5 as well as a piston slidably movable therein and also with a piston rod 6. As shown, the free end of the cylinder 5 is pivotally connected to the rear hatch 2, and the free end of the piston rod 6 is pivotally connected to the body 4. Upon release of a trunk lock, the rear hatch 2 is automatically pivoted upwardly by the pneumatic pressure strut 3 by the increased gas pressure in the cylinder section driving the piston, thus extending the piston rod 6. To prevent sudden or abrupt pivoting of the hatch 2 into its terminal position which may cause it to collide with an obstacle, such as the ceiling of a garage, the arresting device 1 mounted outside of the cylinder 5 of the pneumatic strut limits the extension of the piston rod 6 defining the pivot angle to several positions before ahead of the maximally possible pivot angle is reached, as depicted by the rear hatch 2 shown in solid line.

To achieve a compact structure near the pneumatic strut 3 and as shown in greater detail in the ensuing figures, an arresting member 7 (7', 7") of the arresting device 1 is positioned adjacent to the cylinder 5 of the pneumatic strut 3 and may be moved into frictional engagement with a complementary member 8 (8', 8") which is movable by the piston rod 6. The complementary member 8 is arranged within a tube 9 which is mounted on the piston rod 6 and embraces the cylinder 5 of the pneumatic strut.

Figure 2:
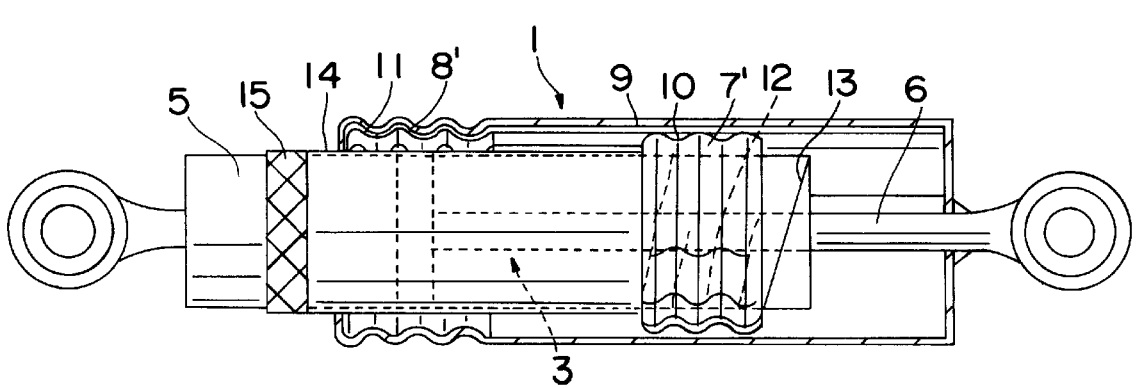
FIG. 2 is a view in longitudinal section of an arresting device comprising corrugated tubes which may be brought into frictional engagement with each other.

In the embodiment of FIG. 2 which depicts the structure of the arresting device of FIG. 1 in greater detail (rotated by 180 degrees), a tubular arresting member 7' is affixed to the cylinder 5. The tubular member 7' is provided with a corrugated outer surface portion 10 extending in the direction of the longitudinal axis of the cylinder, and the complementary member 8' is provided with matching corrugations formed in a surface portion 11 of the tube 9. As the piston rod 6 is moved out of the cylinder 5 of the pneumatic strut the tube 9 moves with it and, by its surface portion 11 will move into engagement with the corrugated surface section 10 thus interrupting further outward movement. Only by use of greater force, such as an upward push of the rear hatch 2 by a user, may the complementary member 8' be pulled further over the arresting member 7', snapping or ratcheting into the respective opposite corrugations as it moves over the arresting member 7'. To limit the force required for the contining movement, the surface portion 11 in the tube 9 will resiliently yield. Depending upon the number of abutments or corrugations in the complementary surface portions 10 and 11, it is possible. The rear hatch 2 may be arrested in as many different angular positions as there are abutments or corrugations in the complementary surface portions 10 and 11. The terminal position with the largest pivot angle and greatest frictional overlap of the surface portions 10 and 11 is attainable by moving the arresting member 7' relative to the cylinder 5. To this end, the arresting member 7' may be threadedly 12,13 connected to the cylinder 5 the cylinder to facilitate its rotation and, hence, axial displacement arresting member 7' is provided with a sleeve 14 extending in the direction of the free end of the cylinder 5 out of the tube 9 where it is knurled, as shown at 15 After adjustment, the arresting member 7' will self-lock. By moving the arresting member 7' to the left as seen in the drawing, the extending movement of the piston rod 6 would terminate sooner, thus leading to a smaller pivot angle of the rear hatch 2. Adjusting the maximum desired pivot angle of the rear hatch would also be possible, of course by similary connecting the complementary member 8' on the piston rod 6.

Figure 3:
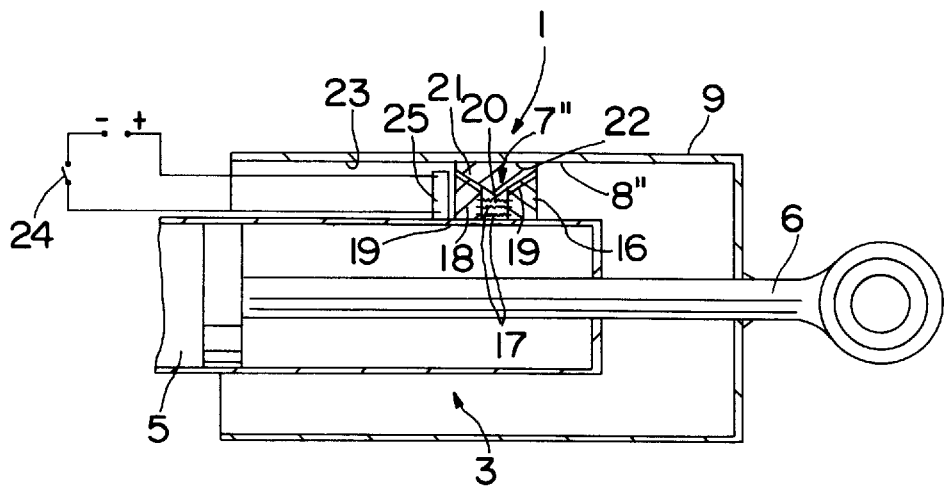
FIG. 3 is a view in longitudinal section of a sensor-controlled arresting device utilizing frictional engagement.
Figure 4:
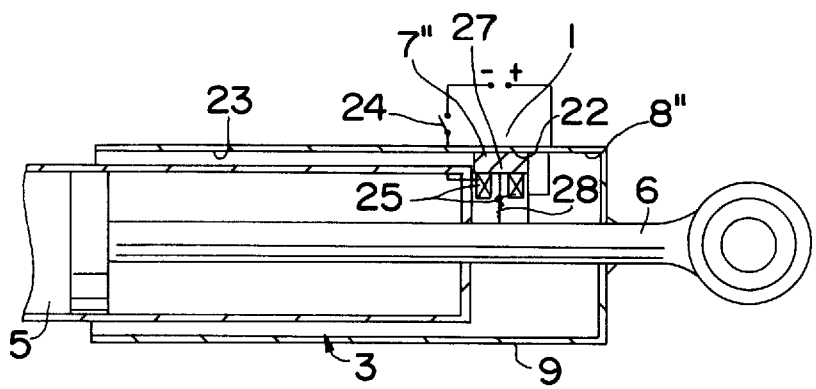
FIG. 4 depicts a further embodiment of an arresting device utilizing frictional engagement.
Figure 5:
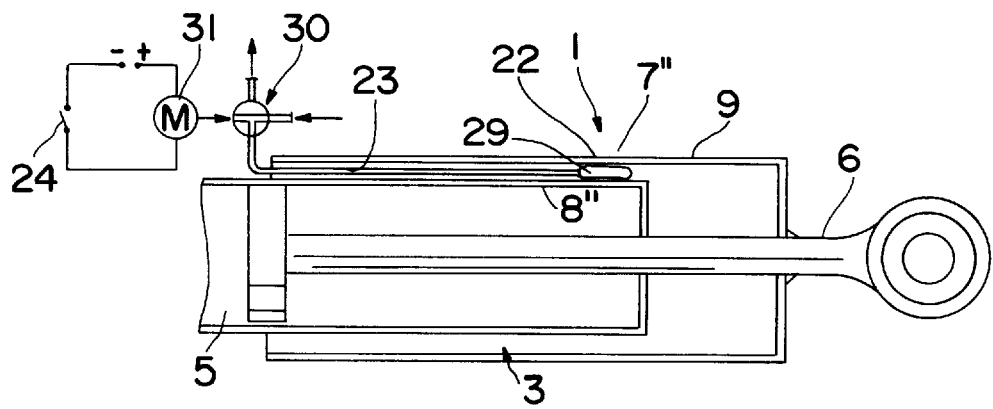
FIG. 5 depicts an arresting device provided with an inflatable and deflatable body for establishing frictional engagement.

FIGS. 3, 4, and 5 depict arresting devices 1 in which arresting members 7" are associated with the cylinder 5 of the pneumatic pressure strut, and in which a tube 9 and the complementary arresting member 8" are affixed to the piston rod 6. The piston rod 6 may in these embodiments be arrested by frictional engagement of an arresting member 7" which is provided with a power-driven frictional breading surface.

FIG. 3 depicts an arresting device 1 in which the cylinder 5 of the pneumatic strut is provided with a power-driver arresting member 7" it includes a stationary chuck 16 and a movable chuck 18 connected to the stationary chuck 16 by tension springs 17. Between them, the chucks 16 and 18 form a conical recess 19 in which is seated an expander chuck or sunk provided with a conical 21 bottom 20 matching the conical recess between the chucks 16 and 18. The surface of the chuck 21 opposite the cone 20 constitutes a frictional surface 22 which may be moved into for engagement with a complementary frictional surface 23 provided at the interior wall of the tube 9. In their normal state, the chuck 16 and the movable chuck 18, bias, the expander chuck 21 against direction of the complementary frictional surface 23 in the tube 9, thus setting the length to which the piston rod 6 can be extended. In order to move the piston rod 6, a switch 24 has to be actuated to close an electric circuit for energizing a solenoid 25 which, in turn, attracts the movable chuck 18 and pulls it away from the stationary chuck 16. This causes the conical recess to become wider and the expander chuck 21 to move out of its engagement with frictional surface 23, thus no longer blocking movement of the tube 9 and the piston rod 6. The circuit may be designed in such a manner that a sensor 26 (FIG. 1) positioned at the rear hatch 2 and connected in parallel to the switch 24 as is well known causes the circuit to open when an obstacle approaches, to deenergize the solensid 25 action. This causes the expander chuck 21 and its frictional surface 22 to be moved against the complementary frictional surface 23 in the tube 9 and the extending movement of the piston rod 6 to be arrested. Furthermore, the switch 24 could be designed to be switched by an actuator in the handle of the rear hatch 2 or be replaced or supplemented by from a sensor, responding to the hand of a user approaches the handle. Such a circuit could also be the rear hatch against burglaries whenever current or the engine of the vehicle is turned off, by forcibly arresting the piston rod of the cylinder of the pneumatic strut.

FIG. 4 depicts an embodiment similar to the one of FIG. 3, with the arresting member 7" on the pneumatic strut cylinder 5 being provided with a frictional component 27 biased into engagement with a complementary frictional surface 23 by a pressure spring 28. The spring 28 may be retracted from the complementary frictional surface 23 by a solenoid 25, thus allowing the tube 9 and the piston rod 6 to move and the rear hatch to pivot.

FIG. 5 depicts a structure of the arresting device 1 in which the arresting member 7" is an inflatable body 29 attached to the cylinder 5 of the pneumatic strut and which, for arresting the tube 9 and the piston rod 6, may be filled with a fluid to increase its circumference for engagement with the tube 9, thus frictionally preventing further movement thereof. A valve 30 is provided at the input of the inflatable body 29. By a motor 31 actuated by a switch 24, the valve 30 in one of its settings cause the body 29 to be inflated , and in another setting it causes it to be deflated. Here, too, a sensor 26 may be provided in addition to the switch 24.

What is claimed is:

1. An apparatus for controlling the opening movement of a door hinged to the body of a vehicle, comprising:
    first and second elongate members adapted to be respectively pivotally connected to the door and the body and telescopingly movable relative to each other between a first length at which the door is closely adjacent to the body and a second length at which the door is pivoted away from the body to a maximum;
    means on the exterior of one of the first and second elongate members for generating friction;
    means on the interior of the other of the first and second elongate members for engaging the friction generating means before the first and second elongate members reach the second length thereby limiting opening movement of the door to less than the maximum.

2. The apparatus of claim 1, wherein one of the first and second elongate members is the cylinder and the other of the first and second members is the piston-driven rod of a gas strut.

3. The apparatus of claim 2, wherein the friction generating and engaging means comprises means for forming a substantially resilient surface having a plurality of axially disposed complementary male and female undulationist.

4. The apparatus of claim 3, wherein the resilient surface forming means comprises tubular means provided with corrugated axial portions.

5. The apparatus of claim 4, wherein the position of at least one of the friction generating and the engaging means is axially adjustable relative to the first and second elongate members.

6. The apparatus of claim 6, wherein at least one of the friction generating and engaging means is threadedly connected to one of the first and second elongate members.

7. The apparatus of claim 1, wherein the friction generating means comprises a member having a frictional front surface movable substantially normal to at least one of the first and second elongate members and the engaging means comprises a friction surface on the other of the first and second elongate members opposite the friction front surface member.

8. The apparatus of claim 7, wherein the friction front surface member comprises resilient means for biasing the friction front surface into engagement with the friction surface and solenoid means for selectively moving the friction front surface out of engagement with the friction surface.

9. The apparatus of claim 8, wherein the solenoid means comprises a conical recess driveable between first and second widths and wherein the friction front surface means comprises a conical section seated in the conical recess.

10. The apparatus of claim 8, wherein the solenoid means comprises annular coil means and wherein the friction front surface means comprises a plunger of the solenoid means.

11. The apparatus of claim 8, wherein the solenoid means is energizable by manually actuable switch means.

12. The apparatus of claim 11, wherein the switch means comprises proximity sensor means.

13. The apparatus of claim 11, wherein the switch means is provided with parallel connected proximity sensor means.

14. The apparatus of claim 1, wherein the friction generating means comprises selectively inflatable means mounted on one of the first and second elongate means.

15. The apparatus of claim 14, wherein the selectively inflatable means is provided with valve means moveable by a motor into a first state for inflating the inflatable means and into a second state for deflating the inflatable means.

16. The apparatus of claim 15, wherein the motor is energizable by manually actuable switch means.

17. The apparatus of claim 16, wherein the switch means is provided with parallel connected proximity sensor means.

* * * * *